No. 875,507. PATENTED DEC. 31, 1907.
W. G. DAUGHERTY.
METHOD OF APPLYING MOLTEN SOLDER TO SHEET METAL.
APPLICATION FILED OCT. 13, 1905.
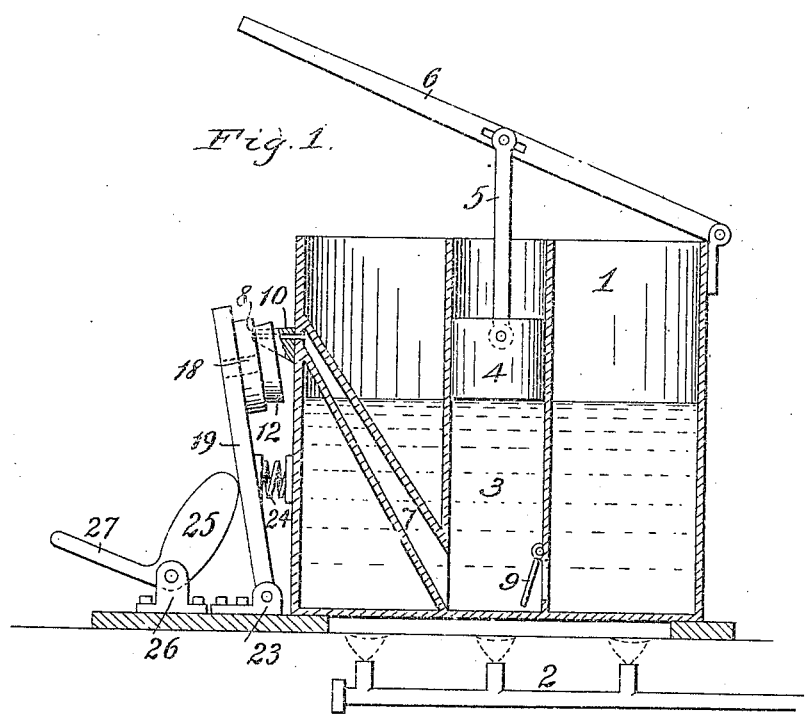
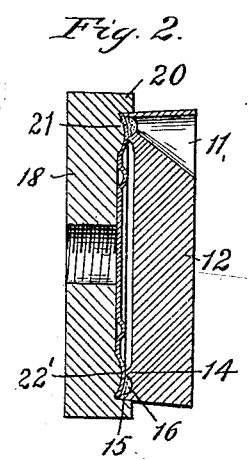
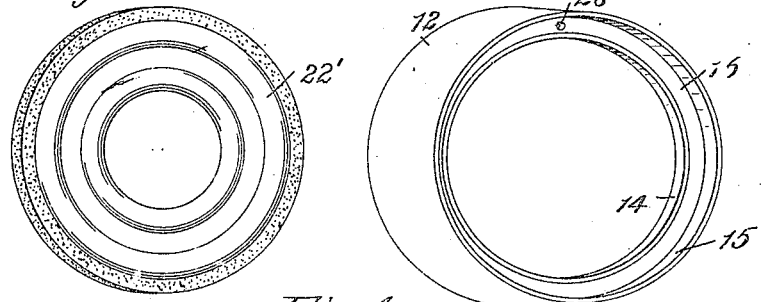
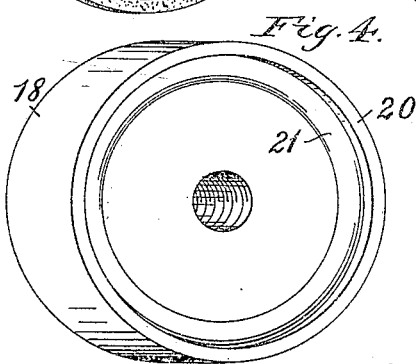
Witnesses:
Geo. B. Pitts.
W. E. Oliver.
Inventor:
Wm. G. Daugherty,
by H. N. Low
Attorney

UNITED STATES PATENT OFFICE.

WILLIAM G. DAUGHERTY, OF BALTIMORE, MARYLAND.

METHOD OF APPLYING MOLTEN SOLDER TO SHEET METAL.

No. 875,507.　　　　Specification of Letters Patent.　　　Patented Dec. 31, 1907.

Application filed October 13, 1905. Serial No. 262,580.

*To all whom it may concern:*

Be it known that I, WILLIAM G. DAUGHERTY, a citizen of the United States, residing at Baltimore, in the State of Maryland, have invented certain new and useful Improvements in Methods of Applying Molten Solder to Sheet Metal, of which the following is a specification.

My invention has for its object to apply solder in a molten state to can-caps, can-bodies or other articles so that it will remain thereon in the form of a film, bead or hem, ready for a subsequent soldering process by which the cap is united with a can body or the edges of the can body joined together.

The invention consists in the steps and procedure hereinafter described and claimed.

In carrying the invention into practical effect I may employ apparatus more or less well known, and, in order to make the nature of the invention clearly understood, I have shown in the accompanying drawings one form of apparatus suitable for the purpose.

In said drawings—Figure 1 is a vertical sectional view of a machine or apparatus for applying molten solder to sheet metal, according to my invention, the said machine being specially adapted for such application of solder to can caps. Fig. 2 is a sectional view, on a larger scale, of the dies between which the caps are held during the process, showing also a cap held in place between the dies and a film or bead of solder which has been applied to the cap. Fig. 3 is a perspective view of what I term the inner die. Fig. 4 is a similar view of the outer die. Fig. 5 is a perspective view of a can cap having a film or bead of solder thereon.

It will be understood that the apparatus will or can be suitably modified, especially as to the shape of the metal-holding means or dies, when the process is to be carried out with can bodies or other articles.

Referring to the drawings, 1 is a receptacle for molten solder in which the latter is kept fluid by a heating means 2, here shown as consisting of gas burners.

3 is a cylinder or pressure chamber within the receptacle, in which fluid solder is received through a check-valve 9 and where pressure is applied to the same by a piston 4 actuated by a rod 5 and lever 6. The operation of the valve 9 is such that the solder which flows freely through it when the piston is raised is prevented from flowing back when the piston is depressed, and is consequently forced through a duct 7 and tube 10 to an outlet or nozzle 8, where it is applied to the can cap or other article.

12 is the inner die having a recess 11 in which the tube 10 fits closely when the two dies are carried towards and against the tube.

18 is the outer die on or within which the inner die removably fits, and which is attached to an arm 19 pivoted to a bracket or lug 23.

24 is a spring applied so as to tend to hold the dies away from the tube 10.

25 is a lever which is weighted or otherwise constructed to press the arm 19 and the dies and their contained cap against the tube 10.

27 is a lever or handle for the actuation of the arm 19, the said lever 25 being pivotally mounted on a bracket or lug 26. By depressing the handle 27 the lever 25 is caused to release the arm 19, whereupon the spring 24 will press the arm outward and carry the dies to a sufficient distance from the tube 10 to allow the inner die to be removed and a cap to be inserted between the dies, or removed therefrom. The opposing faces of the said inner and outer dies are properly shaped, according to the contour of the cap or other article to be operated upon, to fit such article, and leave a space in which solder is confined and applied to the article. In the construction illustrated I have shown a cap formed with a bead 22′ at or near its periphery, which bead is fitted by a corresponding bead 21 on the inner surface of the outer die. The outer die also has a peripheral flange 20 within which fits the can cap and also a somewhat similar flange 15 of the inner die. At a distance within the flange 15 is arranged a similar flange or ring 14, formed on the outer face of the inner die, so as to leave between the flanges 14 and 15 a space 16. With this space communicates the outlet 8 through an orifice 28. The flange 14 is of such height as to meet and fit firmly upon the inner face of the cap, as indicated in Fig. 2 in which it is shown as bearing upon the bead 22′.

By the parts described above the space 16 is entirely inclosed except where it is entered by the orifice 28, so that the solder, forced through said orifice by appliances already described, is confined within the space 16 and forced into contact with the inner face of the cap along and around an annular space thereon where it adheres and cools to a solid state. On can caps the solder may thus be applied along an annular portion of the face of the cap, or it may be applied upon a peripheral flange around the cap, or on both of such surfaces as indicated in Fig. 5. As soon as the solder has been forced by the piston 4 into the space 16, the pressure of the piston is removed by raising the handle 6 and when the solder has set in a solid state in a film or bead around the surface of the cap, the handle 27 is depressed to allow the retraction of the dies and the removal of the inner die, and the finished cap is removed from the outer die, to be replaced by another cap for the repetition of the process.

What I claim is:

1. The herein described method of applying a bead or film of solder to can caps and similar articles, consisting in confining and holding the cap or other article to be soldered, leaving exposed to the solder only that portion of the cap or other article where the solder is to be applied, and then forcing molten solder under pressure to the said exposed portion and while the solder is confined thereon.

2. The herein described method of applying solder to can caps and similar articles, consisting in confining the entire cap or article within a mold or receptacle with the periphery exposed to the entrance of solder and then forcing solder in a molten condition into the mold or receptacle, so as to cause the solder to flow around the exposed periphery of the can cap or similar article and while the solder is confined thereon.

3. The herein described method of applying solder to sheet metal, consisting in applying the solder in a fluid condition, confining the solder on the sheet metal, and subjecting the confined solder to pressure, so as to cause it to flow along the sheet metal.

4. The herein described method of applying solder to sheet metal, consisting in holding the sheet metal with a portion of the same exposed, applying the solder to the said exposed portion in a fluid condition, confining the solder on the exposed portion of the sheet metal, and subjecting the confined solder to pressure, so as to cause it to flow along the sheet metal, and form a bead or film of uniform shape.

In testimony whereof I affix my signature in presence of two witnesses.

WILLIAM G. DAUGHERTY.

Witnesses:
H. N. Low,
T. Bayard Williams.